(12) United States Patent
Uchiyama et al.

(10) Patent No.: US 8,974,007 B2
(45) Date of Patent: Mar. 10, 2015

(54) WHEEL FOR VEHICLE

(75) Inventors: Mikio Uchiyama, Wako (JP); Junki Sagara, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 398 days.

(21) Appl. No.: 13/456,215

(22) Filed: Apr. 26, 2012

(65) Prior Publication Data

US 2012/0274126 A1   Nov. 1, 2012

(30) Foreign Application Priority Data

Apr. 28, 2011   (JP) ................................. 2011-102087

(51) Int. Cl.
| | |
|---|---|
| B60B 19/00 | (2006.01) |
| B60B 27/00 | (2006.01) |
| B60B 1/04 | (2006.01) |
| B62L 1/00 | (2006.01) |
| F16D 121/04 | (2012.01) |

(52) U.S. Cl.
CPC ............. B60B 27/0052 (2013.01); B60B 1/042 (2013.01); B62L 1/00 (2013.01); *Y02T 10/86* (2013.01); *F16D 2121/04* (2013.01)
USPC ............................ 301/6.9; 301/110.5; 188/26

(58) Field of Classification Search
CPC .. B60B 27/0052; B60B 27/023; F16D 65/123
USPC ......... 301/6.1, 6.8, 6.9, 59, 110.5; 188/24.11, 188/26, 218 XL
See application file for complete search history.

(56) References Cited

U.S. PATENT DOCUMENTS

| | | | | |
|---|---|---|---|---|
| 6,318,810 | B1 * | 11/2001 | Miyake et al. | ............. 301/110.5 |
| 6,571,920 | B1 * | 6/2003 | Sturmer et al. | ................. 188/26 |
| 7,066,556 | B2 * | 6/2006 | Irie | ................................ 301/6.9 |
| 7,175,003 | B2 * | 2/2007 | Nimura et al. | ............. 188/18 A |
| 7,695,073 | B1 * | 4/2010 | Chen | ........................... 301/110.5 |
| 2006/0284472 | A1 * | 12/2006 | Chen | .............................. 301/6.9 |

FOREIGN PATENT DOCUMENTS

| | | |
|---|---|---|
| JP | 59-192401 U | 12/1984 |
| JP | 07-257103 | 10/1995 |
| JP | 11-348501 | 12/1999 |

OTHER PUBLICATIONS

Chinese Office Action for corresponding CN Application No. 201210102081.7, Feb. 26, 2014.

* cited by examiner

*Primary Examiner* — Jason Bellinger
(74) *Attorney, Agent, or Firm* — Mori & Ward, LLP (57) ABSTRACT

A wheel for a vehicle includes a hub, a rim, a plurality of spokes, and a disk member. The hub includes a flange portion, a plurality of spoke pedestals, and a plurality of disk member attaching portions. The flange portion outwardly spreads in a radial direction of the hub and is provided on one end portion of the hub in an axial direction of the hub. The spoke pedestals are provided at substantially regular intervals on an inner side of the flange portion and inwardly projects from the flange portion in the radial direction. The disk member attaching portions are provided at substantially regular intervals on an outer periphery of the flange portion and outwardly projects from the flange portion in the radial direction. The disk member attaching portions are provided between the spoke pedestals in a circumferential direction of the flange portion.

7 Claims, 6 Drawing Sheets

WHEEL FOR VEHICLE

CROSS-REFERENCE TO RELATED APPLICATIONS

The present application claims priority under 35 U. S. C. §119 to Japanese Patent Application No. 2011-102087, filed Apr. 28, 2011. The contents of this application are incorporated herein by reference in their entirety.

BACKGROUND OF THE INVENTION

1. Field of the Invention
The present invention relates to a wheel for a vehicle.
2. Discussion of the Background
Conventionally, a wire spoke wheel is disclosed in which a flange portion is provided on a hub and spokes are engaged with the flange portion while a brake disk is attached to an end portion of the flange portion (refer to, for example, Japanese Patent Laid-Open No. Hei 11-348501).

SUMMARY OF THE INVENTION

According to one aspect of the present invention, a wheel for a vehicle includes a hub, a rim, a plurality of spokes, and a disk member. The hub is to be rotatably attached to a swing arm. The hub includes a flange portion, a plurality of spoke pedestals, and a plurality of disk member attaching portions. The flange portion outwardly spreads in a radial direction of the hub and is provided on one end portion of the hub in an axial direction of the hub. The plurality of spoke pedestals is provided at substantially regular intervals on an inner side of the flange portion and inwardly projects from the flange portion in the radial direction. The plurality of disk member attaching portions is provided at substantially regular intervals on an outer periphery of the flange portion and outwardly projects from the flange portion in the radial direction. The disk member attaching portions are provided between the spoke pedestals in a circumferential direction of the flange portion. A tire is attached to the rim. The plurality of spokes connect the rim to the hub. The disk member is attached to at least one axial side of the flange portion.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

The embodiments will now be described with reference to the accompanying drawings, wherein like reference numerals designate corresponding or identical elements throughout the various drawings.

It is to be noted that, unless otherwise specified, such directions as the front, rear, left and right in the following description are same as those regarding a vehicle described below. Further, at a suitable location in the drawings referred to in the following description, an arrow mark FR representative of the forward direction of the vehicle, another arrow mark LH representative of the leftward direction of the vehicle or a further arrow mark UP representative of the upward direction of the vehicle is indicated.

Figure 1:
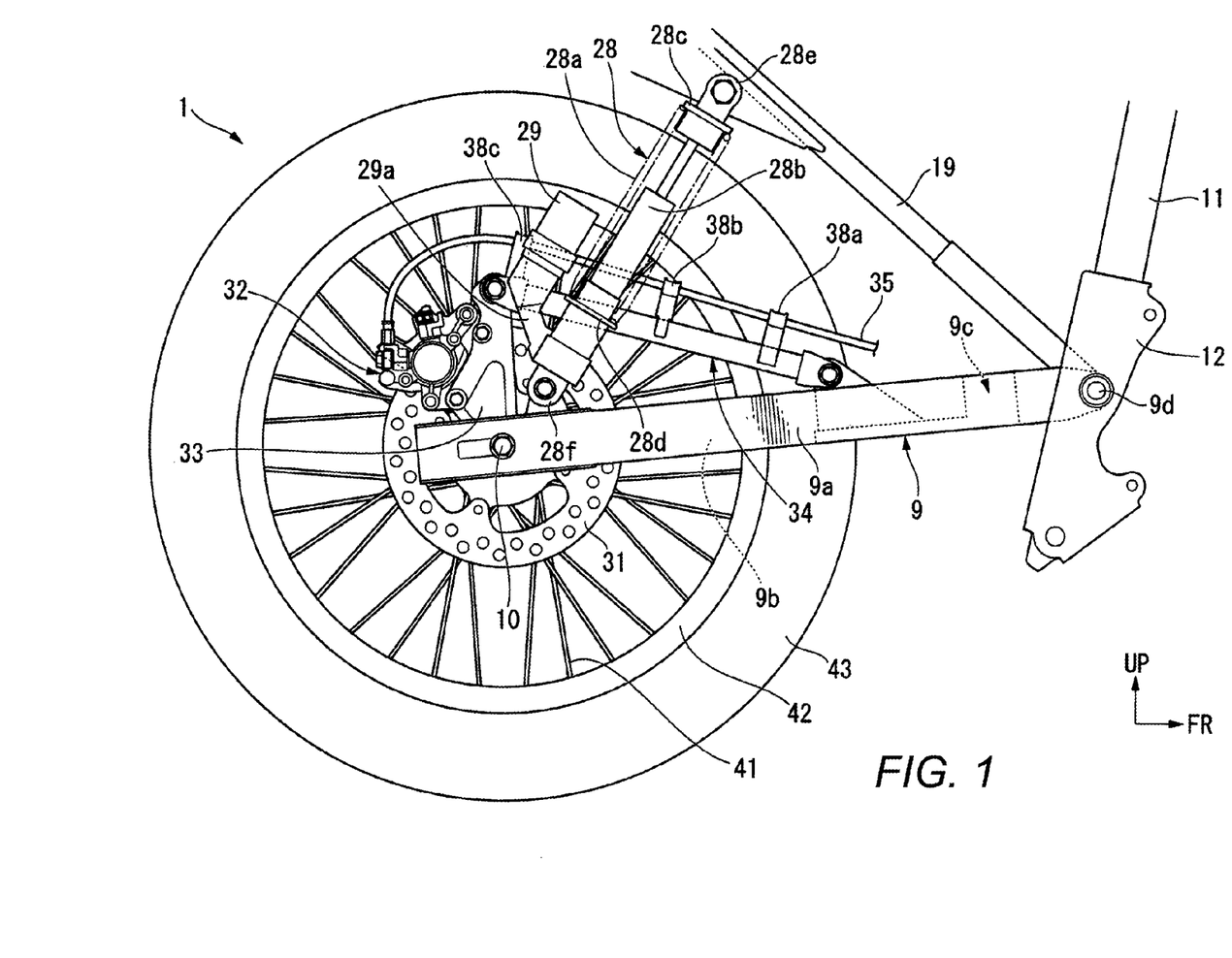
FIG. 1 is a right side elevational view of a rear wheel of a vehicle according to an embodiment of the present invention.

As shown in FIG. 1, a wheel for a vehicle according to the present embodiment has a form of a rear wheel of a motorcycle and is supported for rotation at a rear portion of a swing arm 9. The swing arm 9 is supported at a front end portion thereof on a pivot bracket 12 provided integrally on the lower side of a rear portion of a main frame 11 of the vehicle. A pair of left and right support pipes 19 extend in a rearwardly upwardly inclined state between the pivot bracket 12 and a seat rail (not shown) extending substantially horizontally in a rearward direction from the rear side of a rear portion of the main frame 11. A pair of left and right rear cushions 28 is attached in a forwardly inclined posture between a rear end portion of the left and right support pipes 19 and left and right arm members 9a and 9b of the swing arm 9, respectively.

Each of the rear cushions 28 include a coil spring 28a, a damper 28b of the rod type disposed on the inner side of the coil spring 28a, and first and second spring seats 28c and 28d disposed on the opposite end sides of the damper 28b for supporting upper and lower end portions of the coil spring 28a.

The damper 28b is disposed such that, for example, a cylinder tube of a cylindrical shape is positioned on the lower side while a piston rod in the form of a bar extending from a piston which moves back and forth in the cylinder tube is positioned on the upper side, and the longitudinal direction thereof is inclined such that the upper side thereof is positioned to the front side with respect to the vertical direction.

An upper connecting portion 28e for the support pipes 19 is provided at an upper end portion of the damper 28b, and a lower connecting portion 28f for the swing arm 9 is provided at a lower end portion of the damper 28b.

The first spring seat 28c which supports an upper end portion of the coil spring 28a is provided integrally on the upper connecting portion 28e, and the second spring seat 28d which supports a lower end portion of the coil spring 28a is provided integrally on an outer periphery of a lower portion of the cylinder tube.

A sub tank 29 into which working fluid, compressed gas or the like in the damper 28b is sealed is provided on the rear side of a lower portion of the rear cushions 28. The sub tank 29 has a cylindrical outer shape and is provided rearwardly of and substantially in parallel to the rear cushions 28. A tank holder 29a is integrally provided obliquely rearwardly upwards of the lower connecting portion 28f, and the sub tank 29 is secured at a lower end portion thereof to the tip side of the tank holder 29a.

The swing arm 9 integrally includes the pair of left and right arm members 9a and 9b and a cross member 9c for connecting front end portions of the arm members 9a and 9b to each other. A rear wheel 1 is supported at a rear portion of the left and right arm members 9a and 9b through a rear axle 10 disposed along the vehicle widthwise direction. The swing arm 9 is supported at a front end portion thereof on the pivot bracket 12 for upward and downward rocking motion through a pivot shaft 9d extending along the vehicle widthwise direction.

A brake disk 31 secured to the right side of the rear wheel 1 and a brake caliper 32 for clamping the brake disk 31 are disposed between a rear portion of the right arm member 9a of the swing arm 9 and the rear wheel 1. A rear disk brake is configured principally from the brake disk 31 and the brake caliper 32. The brake caliper 32 is supported for rotation on the rear axle 10 through a caliper bracket 33, and the caliper bracket 33 and the brake caliper 32 are connected to the cross member 9c through a torque rod 34 so that they cannot rotate around the rear axle 10.

The rear disk brake is of the hydraulic type and actuates a master cylinder in response to an input from an operating element such as a brake pedal (all not shown). Hydraulic pressure generated by the master cylinder is transmitted to the brake caliper 32 through a brake pipe 35 so that the brake disk 31 is clamped by a pair of left and right brake pads held in the brake caliper 32.

The brake pipe 35 (brake hose) extending from the master cylinder toward the brake caliper 32 is laid so as to extend along an upper face of the torque rod 34 as viewed in side elevation and is held on the upper face side of the torque rod 34 through a plurality of (three) holding clips 38a, 38b and 38c.

The rear axle 10 is an elongated stepped bolt and penetrates from the left to the right through the left and right arm members 9a and 9b and the rear wheel 1 disposed between the left and right arm members 9a and 9b. An axle nut is screwed and tightened on a threaded shaft projecting rightward from the right arm member 9a such that the rear wheel 1 is supported for rotation between the left and right arm members 9a and 9b.

A driven sprocket wheel 39 (refer to FIGS. 2 and 4) which is driven to rotate by operation of an engine is disposed between a rear portion of the left arm member 9b of the swing arm 9 and the rear wheel 1. The driven sprocket wheel 39 is coordinated to a driving sprocket wheel disposed on the left side of a rear portion of the engine through an endless driving chain (both not shown). The driven sprocket wheel 39, driving sprocket wheel and driving chain configure a chain type conduction mechanism which can transmit power between the rear wheel 1 and the engine.

The rear wheel 1 includes a hub 40 attached rotatably on the swing arm 9, a rim 42 connected to the hub 40 through spokes 41, and a tire 43 attached to the rim 42.

As shown in FIGS. 2 to 5, the hub 40 includes a hub main body portion 45 formed in a substantially cylindrical shape, and flange portions 46 and 47 provided uprightly on the opposite outer sides in the axial direction of the hub main body portion 45 and spread to the outer side in radial directions. Here, outer races of a pair of left and right ball bearings are respectively force fitted on and secured to the opposite end portions of the hub main body portion 45, and a shaft portion of the rear axle 10 is removably fitted in the left and right ball bearings.

The flange portion 46 supports the base end side of those spokes 41 disposed on the right side of the vehicle and also supports the brake disk 31. The flange portion 46 includes a concave curved face 50 on the inner side thereof in the axial direction of the hub (in other words, in the vehicle widthwise direction) so as to rise to the outer side in the radial direction from a little inner side in the axial direction of the hub compared to an end portion of the hub main body portion 45. Further, the flange portion 46 includes a convex curved face 51 formed in a curved state from an outer edge of the concave curved face 50 toward the outer side in the radial direction and the outer side in the axial direction of the hub. A flat face 52 extending to the outer side in the axial direction is provided on an outermost portion of the convex curved face 51 on the outer side in the radial direction.

Meanwhile, on the outer side of the flange portion 46 in the axial direction of the hub, a general surface 55 in the form of a curved face and spoke pedestals 56 for supporting base portions of the spokes 41 are respectively formed. The general surface 55 is formed in a concave curved face which rises to the outer side in the radial direction from the hub main body portion 45 and extends toward the outer side in the axial direction of the hub. The spoke pedestals 56 are formed so as to project from the general surface 55, and a plurality of (for example, approximately 8) such spoke pedestals 56 are disposed at equal distances in the circumferential direction of the flange portion 46.

Each of the spoke pedestals 56 has a triangular shape having an apex on the inner side in the radial direction of the flange portion 46, and more particularly, a cross section (refer to FIG. 4) of one of the spoke pedestals 56 taken along the circumferential direction of the flange portion 46 has a substantially triangular shape having two inclined face portions 60. In each of the spoke pedestals 56, a through-hole 57 is formed which penetrates from each of the inclined face portions 60 to the convex curved face 51 of the flange portion 46. If a spoke 41 is fitted into the through-hole 57 from the end portion side thereof, a head portion 41a formed on the base portion side of the spoke 41 is caught by the inclined face portion 60 in a peripheral edge of the through-hole 57. Meanwhile, the spokes 41 fitted through the same spoke pedestal 56 extend in directions in which they are spaced away from each other on the outer side in the radial direction of the flange portion 46, and cross with the spokes 41 fitted through the adjacent spoke pedestals 56, respectively. Each of the spokes 41 are connected at the end portion side thereof to the rim 42 by a nipple 58.

Figure 2:
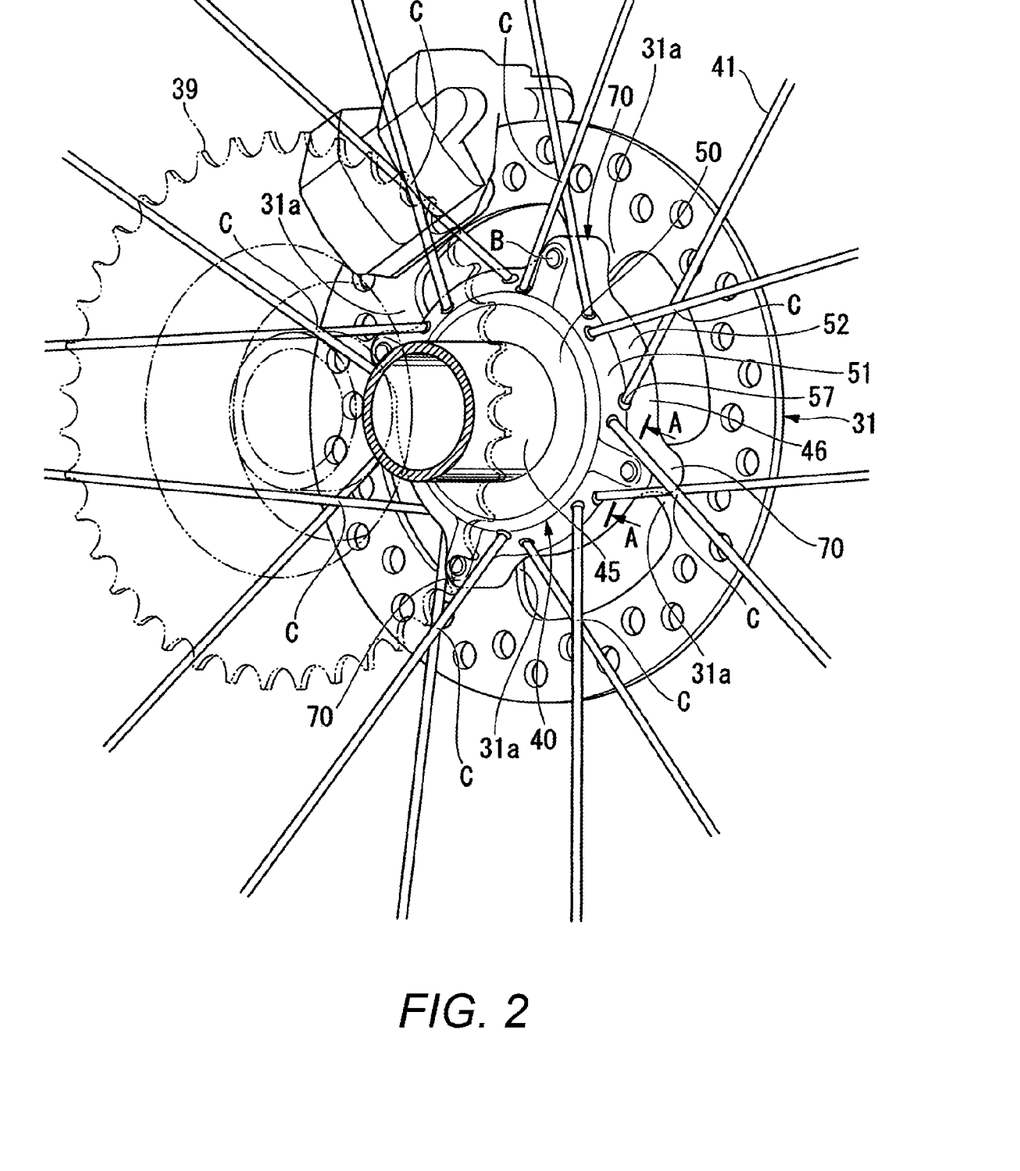
FIG. 2 is a perspective view of a hub on a brake disk side of the above-described rear wheel as viewed from the inner side.
Figure 3:
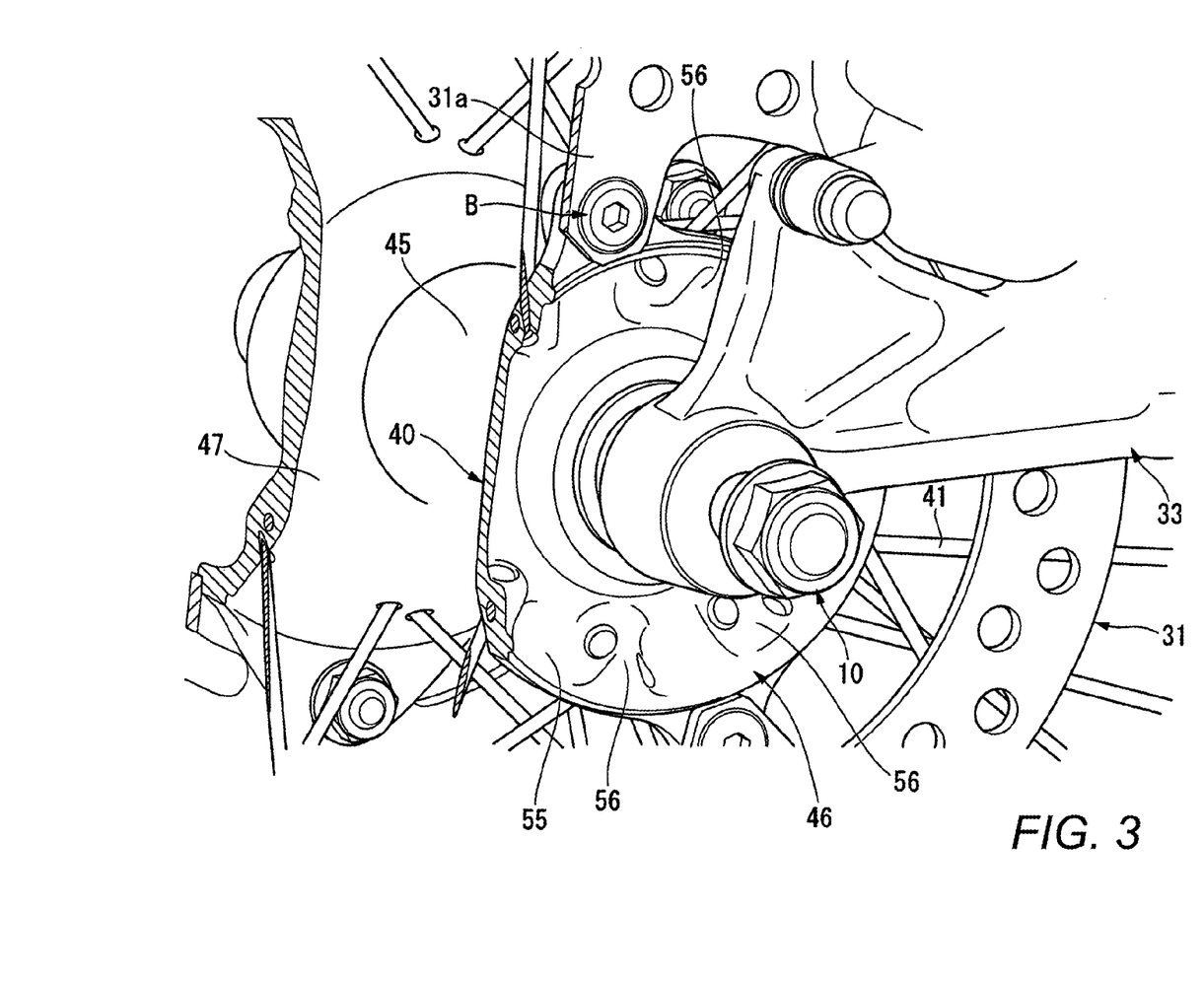
FIG. 3 is a perspective view of the hub on the brake disk side of the above-described rear wheel as viewed from the outer side.

The flange portion 47 supports the base portion side of the spokes 41 positioned on the left side of the vehicle and also supports the driven sprocket wheel 39. The flange portion 47 is formed such that the diameter thereof increases toward the outer side in the axial direction of the hub, and a plurality of sprocket wheel attaching portions 47a which project to the outer side in the axial direction of the hub are formed in a predetermined spaced relationship from each other in the circumferential direction on an outer edge of the flange portion 47. An attaching portion (not shown) of the driven sprocket wheel 39 described above is fastened to out of the sprocket wheel attaching portion 47a by a screw 47b.

Incidentally, a plurality of (for example, approximately four) disk member attaching portions 70 for securing the brake disk 31 are formed at positions between the spoke pedestals 56 in the circumferential direction on an outer periphery of the flange portion 46, which supports the brake disk 31 described hereinabove, such that the disk member attaching portions 70 project toward the outer side in the radial direction. The disk member attaching portions 70 are disposed in a spaced relationship by a predetermined distance (for example, by an equal distance) from each other along the outer periphery of the flange portion 46, and an outer side face of the disk member attaching portion 70 in the axial direction is formed substantially in plane with a face of the flange portion 46 on the outer side in the axial direction of the hub. Further, the spoke pedestals 56 and the disk member attaching portions 70 are formed so as to overlap with each other in the axial direction.

Figure 4:
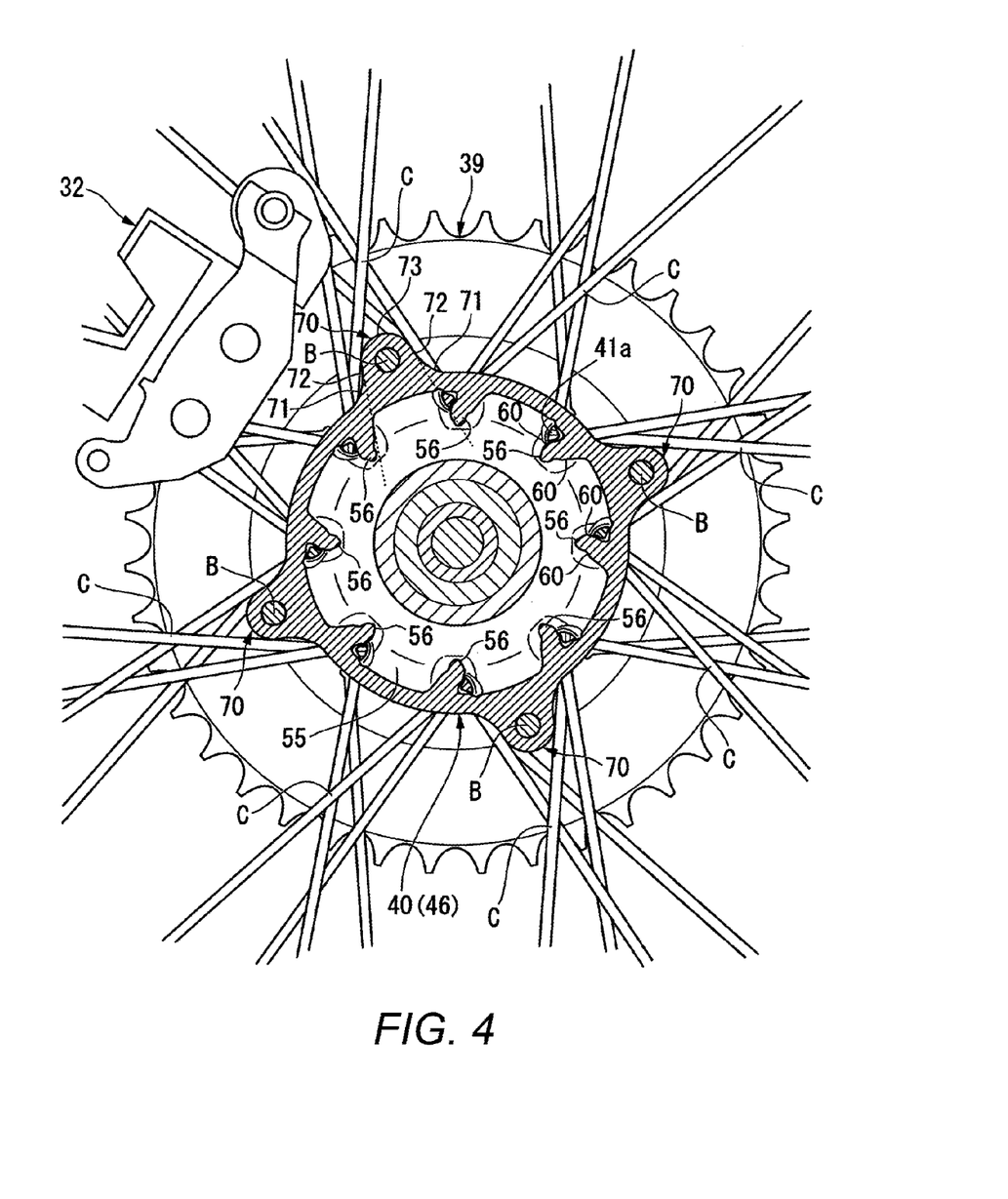
FIG. 4 is a circumferential sectional view of a flange portion on the brake disk side of the above-described rear wheel.

As shown in FIG. 4, each of the disk member attaching portions 70 is formed so as to taper toward the outer side in the radial direction and includes a pair of concave curved faces 71 which gradually rise from the opposite sides in the circumferential direction, a pair of inclined faces (circumferential direction edge portions) 72 connecting to the concave curved faces 71 and extending to the outer side in the radial direction, and a convex curved face 73 connecting the inclined faces 72 on the tip portion side. The spoke pedestals 56 having a cross section of a triangular shape positioned adjacent to each other in the circumferential direction are disposed on extension lines (indicated by chain lines in FIG. 4) of the pair of inclined faces 72, and the extension lines of the inclined faces 72 and the inclined face portions 60 of the spoke pedestals 56 are disposed in an overlapping relationship with each other. Each of the disk member attaching portions 70 has a threaded hole for securing formed therein such that it penetrates therethrough in the axial direction of the hub. The brake disk 31 is, more particularly attaching portions 31a projecting to the inner circumference side from the brake disk 31 are, fastened to the disk member attaching portions 70 through screws B.

Figure 5:
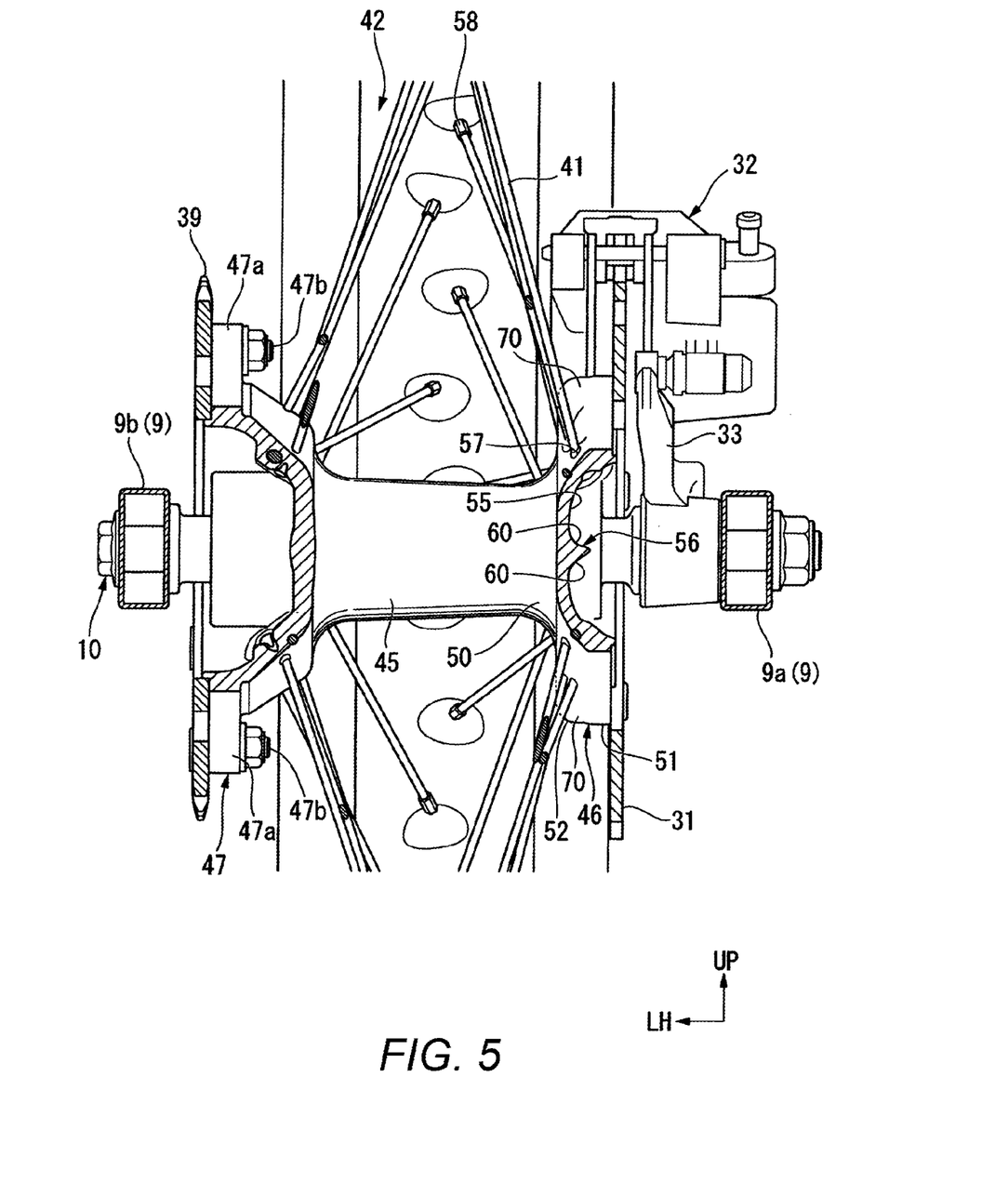
FIG. 5 is a partial sectional view of the above-described rear wheel as viewed from the outer side in the radial direction.
Figure 6:
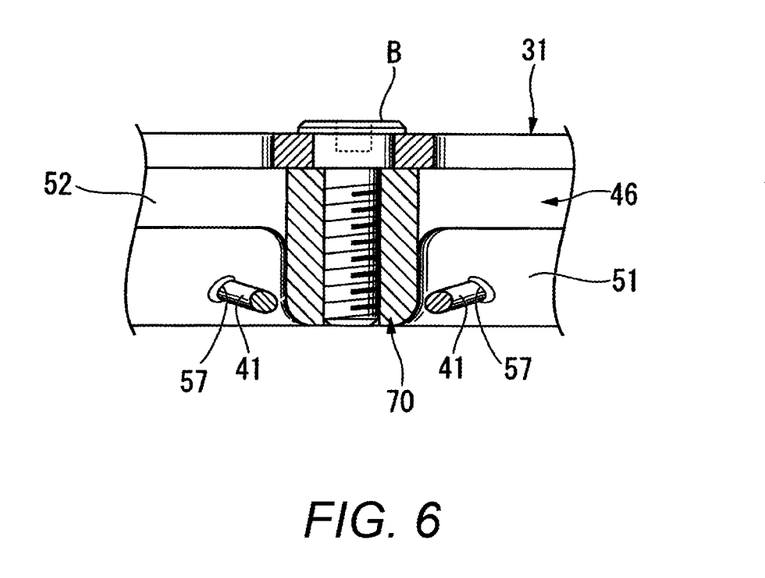
FIG. 6 is a sectional view along a line A-A of FIG. 2.

As shown in FIGS. 2, 5 and 6, each of the disk member attaching portions 70 is chamfered with a curved face at an angle portion thereof on the inner side in the axial direction of the hub, and consequently, the widthwise and heightwise dimensions of the disk member attaching portions 70 decrease a little toward the inner side in the axial direction of the hub. Further, the disk member attaching portion 70 is disposed at a position at which at least the chamfered portion thereof traverses the inner side in the radial direction with respect to a crossing portion C at which the spokes 41 extending from adjacent spoke pedestals 56 cross with each other. Here, on the inner side in the radial direction with respect to the crossing portion C, a substantially triangular region is defined by the spokes 41, and the disk member attaching portion 70 is disposed such that at least the chamfered portion thereof crosses the substantially triangular region from the outer side toward the inner side in the axial direction of the hub.

Accordingly, according to the rear wheel 1 of the vehicle of the embodiment described above, the disk member attaching portions 70 are disposed such that they are sandwiched between the spoke pedestals 56 in the circumferential direction of the flange portion 46. Consequently, the spoke pedestals 56 projecting toward the inner side in the radial direction of the flange portion 46 are disposed at portions to which stress in the circumferential direction is applied when braking force is input to the disk member attaching portions 70. Thus, since the portions of the flange portion 46 to which stress is applied are increased in thickness, it is possible to reduce the thickness of portions other than the spoke pedestals 56 in comparison with a conventional wheel thereby to reduce the weight while assuring the rigidity of the flange portion 46.

Further, since the spokes 41 are not disposed in the inner side of the disk member attaching portions 70 in the axial direction of the hub, it is possible to increase the thickness on the inner side in the axial direction of the hub to enhance the rigidity of the disk member attaching portions 70. Consequently, the dimension of the hub 40 in the axial direction can be reduced in comparison with the case in which the thickness of the disk member attaching portions 70 is increased to the outer side in the axial direction of the hub.

Further, since the spoke pedestals 56 are formed on extension lines of the inclined faces 72 of the disk member attaching portions 70, the positions at which stress of the disk member attaching portions 70 is concentrated can be supported by the inclined face portions 60 of a triangular shape of the spoke pedestals 56 of the flange portion 46. Therefore, it is possible to assure the rigidity of the flange portion 46 efficiently to reduce the weight.

Further, since the inclined face portions 60 of the spoke pedestals 56 are formed on extension lines of the inclined faces 72 of the disk member attaching portions 70, the portions of the disk member attaching portions 70 at which stress is concentrated can be supported efficiently by the spoke pedestals 56. Consequently, further reduction of the weight can be anticipated, and sufficient rigidity of the flange portion 46 can be assured.

Further, since the disk member attaching portions 70 are chamfered, they are formed so as to become small toward the inner side in the axial direction of the hub. Consequently, even in a case in which the distance between the spoke pedestals 56 or between the spokes 41 is comparatively small, the disk member attaching portions 70 can be placed into the inner side in the axial direction of the hub from between the spokes 41. As a result, it is possible to increase the thickness of the disk member attaching portions 70 to enhance the rigidity with certainty.

It is to be noted that the present invention is not limited to the configuration of the embodiment described hereinabove, and design change is possible without departing from the subject matter of the present invention.

For example, the present invention may be applied to a saddle type electric vehicle which includes not a pair of left and right main frames and pivot frames but a single main frame and a single pivot frame. Here, the saddle type electric vehicle described above includes general vehicles on which an occupant can ride straddling the vehicle body, and includes not only motorcycles (including bicycles with a prime mover and scooter type vehicles) but also three-wheeled vehicles (including vehicles having one front wheel and two rear wheels and vehicles having two front wheels and one rear wheel) and four-wheeled vehicles.

Further, while, in the foregoing description of the embodiment, the case in which the spoke pedestal 56 is formed at eight locations and the disk member attaching portion 70 is formed at four locations is described, the number of such spoke pedestals 56 or disk member attaching portions 70 is not limited to those values but may be set suitably in accordance with the number of the spokes 41, the diameter of the brake disk 31 and so forth.

Further, while, in the foregoing embodiment, the configuration of the disk member attaching portions 70 of the flange portion 46 on the side to which the brake disk 31 is attached is described, the disk member is not limited to the brake disk 31, but may be, for example, the driven sprocket wheel 39 in the form of a disk. That is, the disk member attaching portions 70 of the configuration described above may be formed on the flange portion 47 on the side to which the driven sprocket wheel 39 is assembled to fasten the driven sprocket wheel 39. Further, while the case is described in which the brake disk 31 is provided on the right side and the driven sprocket wheel 39 is provided on the left side, the disposition of the brake disk 31 and the driven sprocket wheel 39 may be reversed between left and right.

Further, while the rear wheel 1 for a motorcycle is described as an example, the present invention is not limited to the rear wheel 1 but can be applied also to a front wheel to which a disk member is attached.

Obviously, numerous modifications and variations of the present invention are possible in light of the above teachings. It is therefore to be understood that within the scope of the appended claims, the invention may be practiced otherwise than as specifically described herein.

What is claimed is:
1. A wheel for a vehicle, comprising:
a hub to be rotatably attached to a swing arm, the hub comprising:

a flange portion outwardly spreading in a radial direction of the hub and provided on one end portion of the hub in an axial direction of the hub;

a plurality of spoke pedestals provided at substantially regular intervals on an inner side of the flange portion and inwardly projecting from the flange portion in the radial direction; and a plurality of disk member attaching portions provided at substantially regular intervals on an outer periphery of the flange portion and outwardly projecting from the flange portion in the radial direction, the disk member attaching portions being provided between the spoke pedestals in a circumferential direction of the flange portion;

a rim to which a tire is attached;

a plurality of spokes connecting the rim to the hub; and a disk member attached to at least one axial side of the flange portion.

2. The wheel for a vehicle according to claim 1, wherein the spoke pedestals are each provided on extension lines of circumferential direction edge portions of the disk member attaching portions when viewed from the axial direction.

3. The wheel for a vehicle according to claim 1, wherein the spoke pedestals each have a substantially triangular shape having an apex on a radially inner side of the flange portion when viewed from the axial direction, and wherein each of the spoke pedestals includes inclined face portions provided along the substantially triangular shape, the inclined face portions of each of the spoke pedestals being disposed on extension lines of the circumferential direction edge portions of the disk member attaching portion.

4. The wheel for a vehicle according to claim 1, wherein the spoke pedestals and the disk member attaching portions overlap with each other in the axial direction.

5. The wheel for a vehicle according to claim 1, wherein the disk member is attached to the disk member attaching portions.

6. The wheel for a vehicle according to claim 1, wherein the spoke pedestals are inclined with respect to the radial direction.

7. The wheel for a vehicle according to claim 2, wherein the circumferential direction edge portions of each of the disk member attaching portions respectively include inclined faces disposed to be inclined with respect to the radial direction.

* * * * *